F. E. BRYAN.
AUTOMOBILE HORN.
APPLICATION FILED SEPT. 16, 1915.

1,243,650.

Patented Oct. 16, 1917.
2 SHEETS—SHEET 1.

Witnesses
William Conway
C. R. Ziegler

Inventor
Frederick E. Bryan
By Joshua R. H. Potts
his Attorney

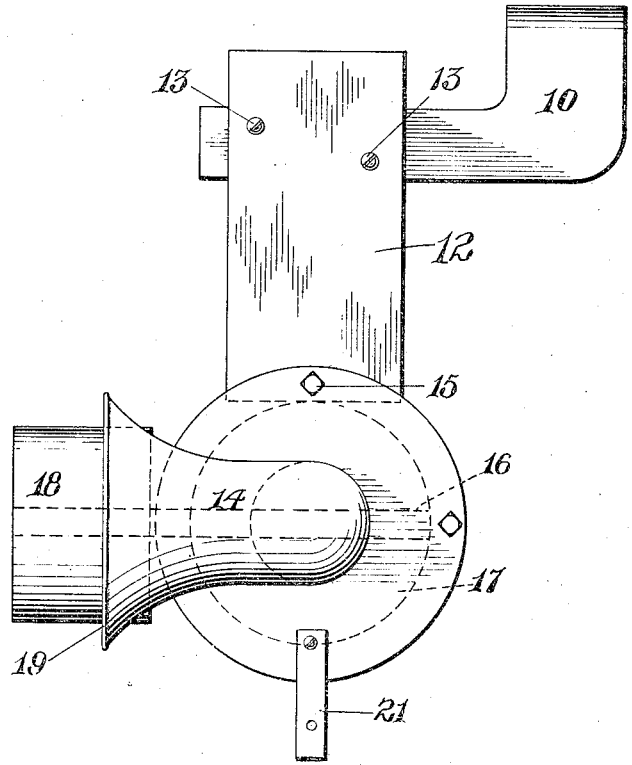
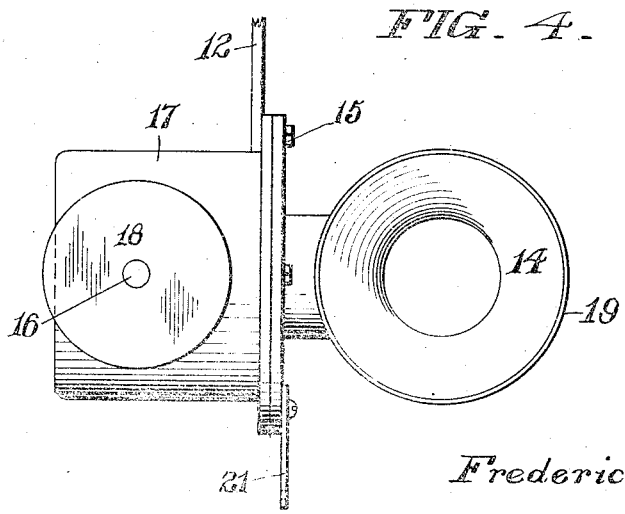

UNITED STATES PATENT OFFICE.

FREDERICK E. BRYAN, OF WYNCOTE, PENNSYLVANIA, ASSIGNOR OF ONE-HALF TO FREDERICK LIGHT, JR., OF PHILADELPHIA, PENNSYLVANIA.

AUTOMOBILE-HORN.

1,243,650.  Specification of Letters Patent.  Patented Oct. 16, 1917.

Application filed September 16, 1915. Serial No. 50,958.

*To all whom it may concern:*

Be it known that I, FREDERICK E. BRYAN, a citizen of the United States, residing at Wyncote, in the county of Montgomery and State of Pennsylvania, have invented certain new and useful Improvements in Automobile-Horns, of which the following is a specification.

My invention relates to improvements in automobile horns, and more particularly to an improved combination of automobile engine and horn, whereby the horn is operated by the fan belt or pulley of the ordinary internal combustion engine. The object of the invention is to provide an improved mounting and horn thereon which will be normally spaced from the fan operating belt, and which can be easily moved into operative position, so that the horn will be continuously operated as long as the parts are so held.

A further object is to provide a horn operated by a pulley on the horn drive shaft, and said pulley located in proximity to the fan operating belt of the engine and adapted to be moved into and out of contact with the belt, the said horn having a spring support which normally holds the horn in position to maintain the pulley out of contact with the belt, the spring being bent by the movement of a cord or other flexible device located in convenient position relative to the steering wheel of the automobile.

With these and other objects in view, the invention consists in certain novel features of construction and combinations and arrangements of parts as will be more fully hereinafter described and pointed out in the claims.

In the accompanying drawings:

Fig. 3 is a view in side elevation of my improved horn with its support removed from the engine, and Fig. 4 is a fragmentary view in side elevation of Fig. 3.

Figure 1:
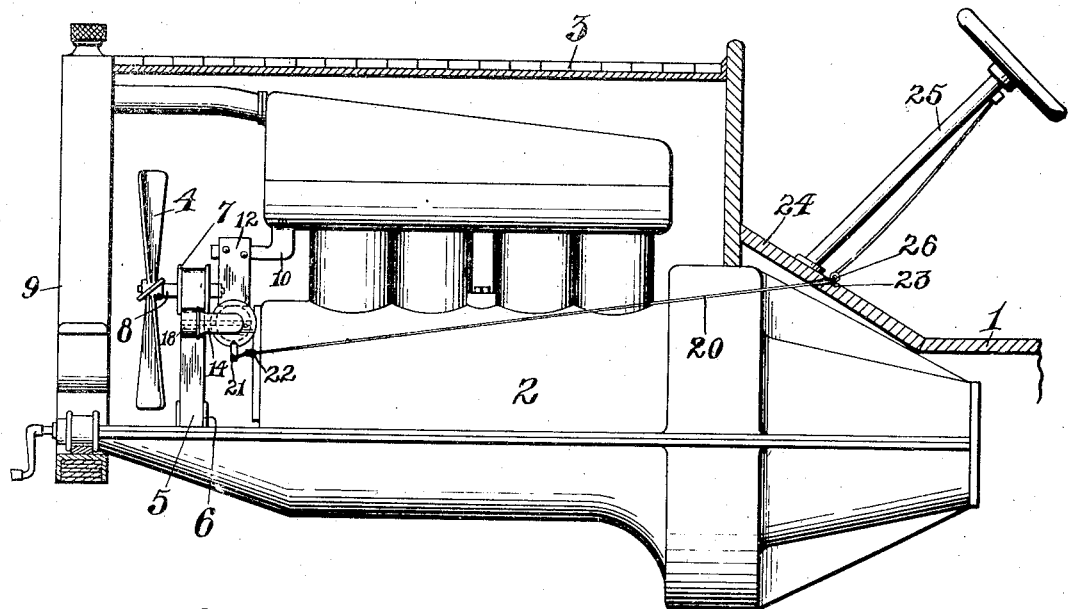
Figure 1 is a view in longitudinal section through the hood of an automobile showing an ordinary type of engine therein with my improvements attached.

1 represents an automobile, and 2 the engine for driving the same. As is customary, the engine is located within a hood 3 at the front end of the automobile, and is provided with a fan 4 driven by a belt 5 which connects a drive pulley 6 with a driven pulley 7 on fan shaft 8.

The parts above described are in common use with several types of engine, and hence the structure thereof need not be described in detail except to say that whenever the engine is running, the belt 5 is moving to turn the fan and cause a circulation of air through the radiator 9 and around the engine 2.

10 represents a bracket which is secured to the engine 2 by means of a bolt 11, and I would have it understood that my improvements do not change the construction of the engine in the slightest, as I utilize for the purpose one of the bolts which is found on the engine.

The bracket 10 is of angular form, and at its free end supports a relatively wide vertically positioned spring 12 which is secured by screws 13 or otherwise to the bracket 10. To the lower end of the spring 12, my improved horn 14 is connected. While, of course, the particular means of connecting the spring and horn is immaterial, I have illustrated a bolt 15 for the purpose.

The operating means for the horn may of course vary to suit the trade, and I have not attempted to illustrate any particular sound creating means, but have shown a shaft 16 extending from the side of the casing 17 constituting a part of the horn structure, and it is to be understood that the turning of this shaft 16 causes the sounding of the horn.

Figure 2:
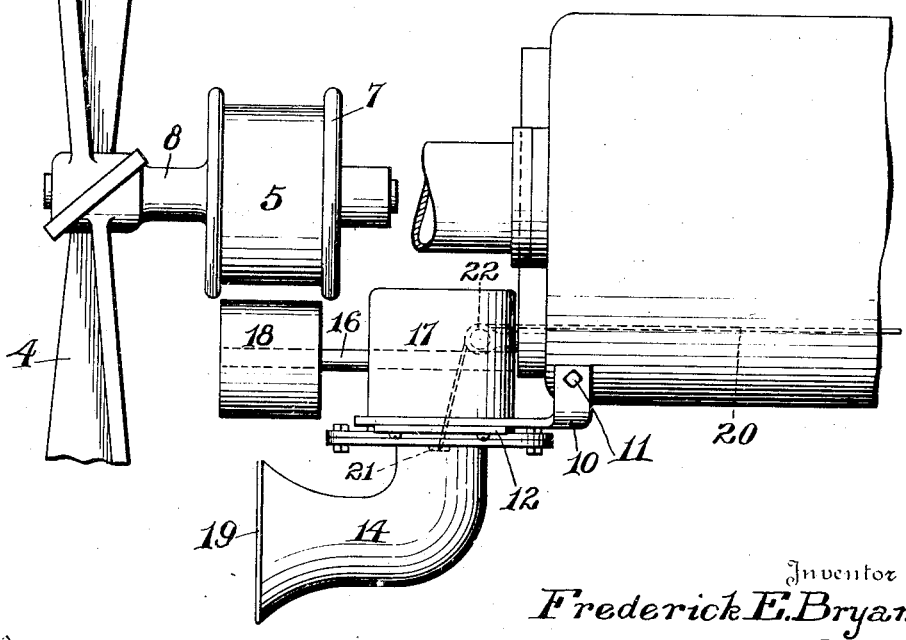
Fig. 2 is an enlarged fragmentary plan view illustrating the position of my improved horn.

On the outer end of the shaft 16, a pulley 18 is located, and this pulley is normally spaced from the belt 5 as shown clearly in Fig. 2. The free end of the horn is flared as shown at 19, and preferably blows in a forward direction through the radiator 9.

The spring 12 normally holds the parts in the position shown in Fig. 2, and to move the horn so as to position pulley 18 against the belt 5, I provide a flexible connecting device 20 which is secured to a depending finger 21 on the bottom of the horn, is passed around a pulley 22 secured to the engine 2, extends through an opening 23 in the platform 24 of the automobile, and is secured at its end to the steering post 25 in any approved manner.

I also preferably provide a guide 26 on platform 24, but it is to be understood that the particular disposition of the flexible connecting device may be varied to suit the trade. In any event, the flexible connecting device will be located in a convenient reach of the driver, so that he can give the flexible device a pull and cause the spring 12 to bend, thereby moving the pulley 18 against the belt 5, and as long as the parts are so held, the horn will be sounded, but as soon as the flexible connecting device is released, the spring 12 will cause the parts to assume their normal position as shown in Fig. 2.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with an automobile, an engine driving the automobile, a fan, and a belt transmitting motion to the fan and driven by the engine, of a bracket secured to the engine, a flexible member secured to the bracket, a horn carried by the flexible member, an operating pulley on the horn normally spaced from the belt, a steering post on the automobile, and a flexible connecting device secured to the horn and located adjacent the steering post, said flexible connecting device adapted when moved in one direction to move the horn so as to position the pulley against the belt.

2. The combination with an automobile, an engine driving the automobile, a fan, and a belt transmitting motion to the fan and driven by the engine, of a bracket secured to the engine, a spring secured to the bracket, a horn carried by the spring, an operating pulley on the horn normally spaced from the belt, a steering post on the automobile, and a flexible connecting device secured to the horn and located adjacent the steering post, said flexible connecting device adapted when moved in one direction to move the horn so as to position the pulley against the belt, substantially as described.

In testimony whereof I have signed my name to this specification in the presence of two subscribing witnesses.

FREDERICK E. BRYAN.

Witnesses:
C. E. POTTS,
MARIE JACKSON.